United States Patent [19]

Bunker et al.

[11] Patent Number: 4,512,678
[45] Date of Patent: Apr. 23, 1985

[54] SLIDE RELEASE MECHANISM

[75] Inventors: James W. Bunker, Canyon Country; Robert S. Ritchie, Valencia, both of Calif.

[73] Assignee: The United States of America as represented by the Administrator of the National Aeronautics and Space Administration, Washington, D.C.

[21] Appl. No.: 393,584

[22] Filed: Jun. 30, 1982

[51] Int. Cl.³ .............................................. F16B 1/00
[52] U.S. Cl. ........................................ 403/15; 403/16; 403/322; 89/1.57
[58] Field of Search .......................... 403/15, 16, 322; 89/1.5 F, 1 B

[56] References Cited

U.S. PATENT DOCUMENTS

| | | | |
|---|---|---|---|
| 2,161,082 | 6/1939 | Ovtschinnikoff | 89/1.5 F |
| 2,346,494 | 4/1944 | Leland | 89/1.5 F |
| 2,485,921 | 10/1949 | Rockwell | 89/1.5 F X |
| 2,585,870 | 2/1952 | Spielman | 89/1.5 F |
| 2,732,765 | 1/1956 | Boyd | 89/1.5 F |
| 2,750,842 | 6/1956 | Myers | 89/1.5 F |
| 3,071,404 | 1/1963 | Van Hove | 403/11 X |
| 3,084,597 | 4/1963 | Beyer | 403/15 X |
| 3,200,706 | 8/1965 | Kinard | 89/1.5 F X |
| 3,261,261 | 7/1966 | Brown | 89/1.5 F X |

*Primary Examiner*—Andrew V. Kundrat
*Attorney, Agent, or Firm*—Russell E. Schlorff; John R. Manning; Marvin F. Matthews

[57] ABSTRACT

A releasable support device comprising a hollow body (A) with a sleeve (B) extending transversely therethrough for receiving the end of a support shank (E). A slider-latch (C), optionally lubricated, extends through side recesses (23) in the sleeve to straddle the shank, respectively, in latched and released positions. The slider-latch is slid from its latched to its unlatched position by a pressure squib (10) whereupon a spring (24) or other pressure means pushes the shank out of the sleeve. At the same time, a follower element (D) is lodged in and closes the hole in the body wall from which the shank was discharged.

7 Claims, 12 Drawing Figures

SLIDE RELEASE MECHANISM

DESCRIPTION

ORIGIN OF THE INVENTION

The invention described herein was made in the performance of work under a NASA contract and is subject to the provisions of section 305 of the National Aeronautics and Space Act of 1958 (72 stat. 435, USC 2457).

TECHNICAL FIELD

This invention relates to devices for releasing or disconnecting a load carried, for instance, by an aircraft or other space vehicle.

BACKGROUND OF THE INVENTION

The Space Shuttle Orbiter vehicle of NASA is attached to an external tank at three points by means of a forward spherical or monoball joint incorporating a separation or shear bolt and two aft, frangible nuts. The shank of the shear bolt is severed by an explosive force co-axial with the load and on the order of 60,000 psi, since the severable section must carry the intended load. The total release force of some 235,000 pounds applies a severe shock to the vehicle and deforms the release device so as to prevent reuse.

The prior art has suggested explosive disconnect devices acting transversely of the load-carrying shank or other element. Such devices are disclosed in the following U.S. Pat. Nos.: Myers 2,750,842, Van Hoye 3,071,404, Kinard 3,200,706, Brown 3,261,261, Rockwell 2,485,921, and Beyer 3,084,597. However, these, generally, are complicated, incorporating multiple elements to effect the disconnect, and neither these or any prior art known to applicant contemplates a pressured follower member for closing an opening through which the disconnected load-carrying part is discharged.

THE PRESENT INVENTION

In accordance with the present invention, there is provided a hollow, rectangular body having aligned apertures in opposite walls through which a guide sleeve extends. An end of the load-carrying shank slidably extends partially into the sleeve. Slidable in the body transversely of the shank is a lubricated slider-latch including a keyhole shaped orifice or cutout including a release portion and space-apart latching-rail portions straddling the shank and, normally, received in laterally opposite recesses in the sleeve and adjacent grooves in the shank for supporting and disconnecting the load.

A pressure source or squib mounted in the body actuates a piston and rod in alignment with an end of the slider so that when the release is initiated the slider-latch is actuated to release the shank from the rail portions of the slider-latch and position the release orifice portion about the shank. Thereupon, a compression spring and plunger eject the shank from the sleeve and, with it, move a follower into the open end of the sleeve where it lodges against spaced shoulders to close the opening. An attenuator on the end of the slider strikes an end plate on the body to protect the slider from damage.

BRIEF DESCRIPTIONS OF THE FIGURES

In the accompanying drawings.

DESCRIPTION OF THE PREFERRED EMBODIMENT

Figure 1:
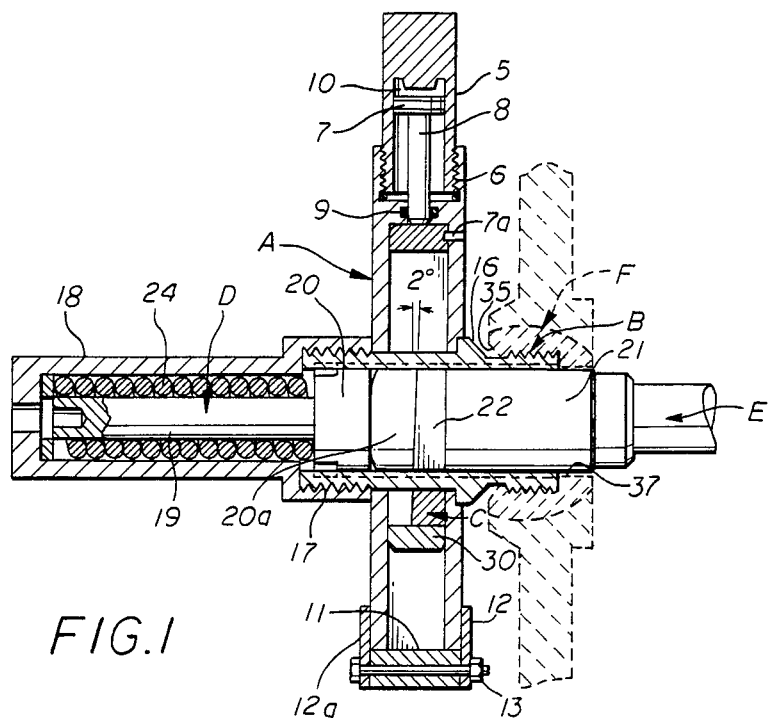
FIG. 1 is a sectional view of the slide release device assembled and in normal latched relationship.

Referring now to FIG. 1, the slide release mechanism of the present invention is shown attached to a spherical bearing fitting F of the Space Shuttle Orbiter (not shown). Extending through a stepped axial bore 37 in the spherical bearing is a load-carrying member E which is the forward attachment means extending from the external tank (not shown). The releasable support device replaces the explosive shear bolt to provide for release of the load carrying member during separation of the external tank from the Space Shuttle Orbiter.

Figure 2:
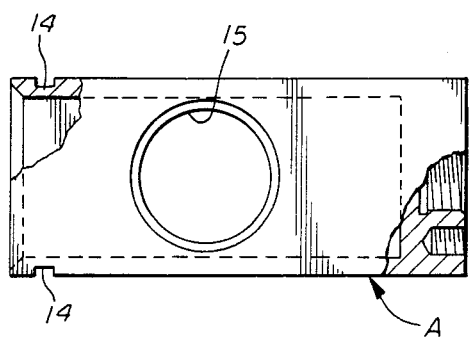
FIGS. 2 and 2a are a plan view and a longitudinal center section through the body.
Figure 2A:
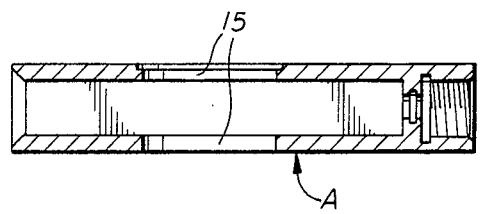
Figure 3:
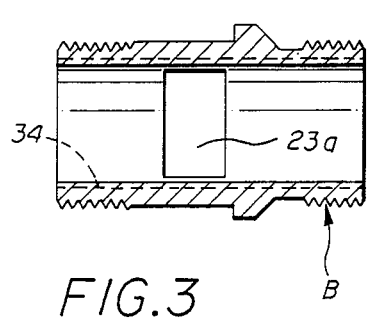
FIGS. 3 and 3a are longitudinal center sections of the sleeve part at 90° to each other.
Figure 3A:
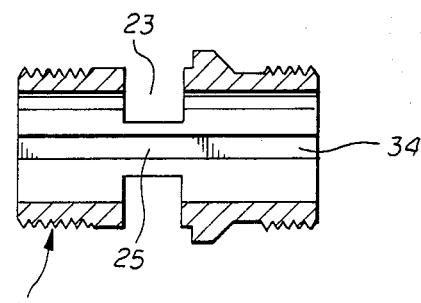
Figure 4:
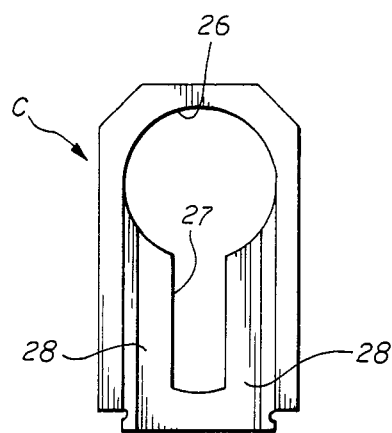
FIGS. 4 and 4a are a plan view and center longitudinal section, respectively, of the slider-latch part.
Figure 4A:
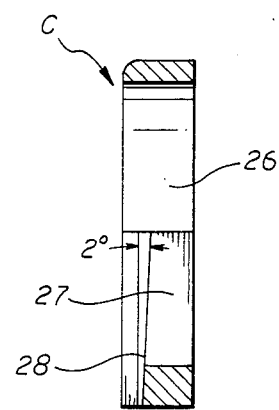
Figure 5:
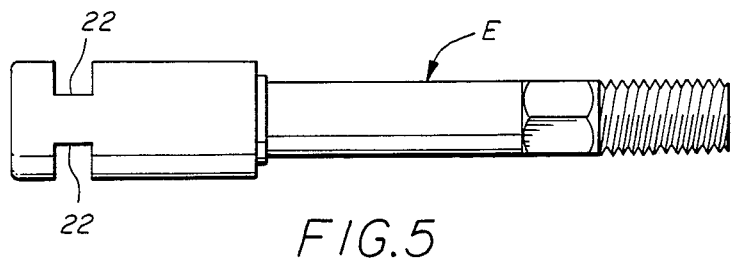
FIGS. 5 and 5a are side views at 90° of the load supporting, disconnectable shank.
Figure 5A:
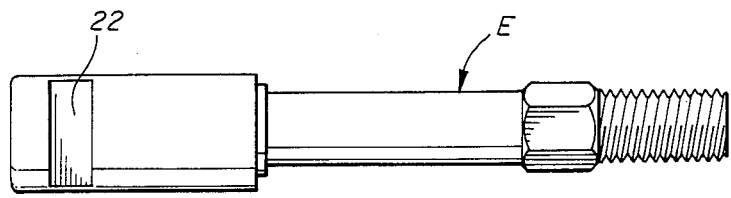
Figure 6:
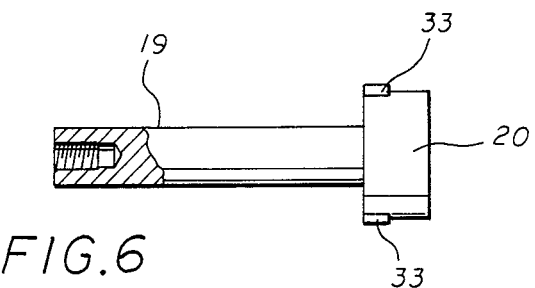
FIGS. 6 and 6a are side and end views of the follower.
Figure 6A:
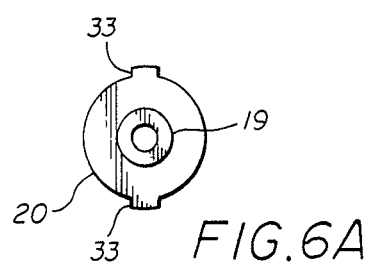

The slider release mechanism is comprised essentially of a box shaped body A (FIGS. 2 and 2a), a guide sleeve B (FIGS. 3 and 3a), a slider-latch C (FIGS. 4 and 4a) and a follower D (FIGS. 6 and 6a). As previously mentioned, slider release mechanism is engaged with the load carrying member E (FIGS. 5 and 5a) which forms the forward attachment means for the external tank.

The slider release mechanism is attached to the spherical bearing fitting F by engagement of the male threads at the end of guide sleeve B with the female threads in stepped axial bore 37 which extends through the spherical bearing. The juncture of the female threaded portion and the reduced portion of bore 37 forms an arresting member 35 the purpose of which will be explained subsequently.

The box-shaped body A is generally in the shape of a rectangle having an internal cavity for receiving slider-latch C. One end of the body is closed and the other end is initially open. The closed end of body A is provided with a stepped axial bore communicating with the internal cavity. The enlarged outer end 6 of the axial bore is provided with internal threads which threadingly receive the external threads of a cylinder 5. Located in a chamber of cylinder 5, is a piston 7, one end having a stem 8 projecting through the small portion of the axial bore to contact the end of slider-latch C, the other end being exposed to a manifold 10 which receives the force of an actuating charge or other pressure. The open end of body A may be closed by any conventional removeable end closure means, such as end plate 11 and end cover 12. A threaded member 13 extends through aligned bores in end plate 11 and ears 12a of end cover 12. The narrow edge wall of body A is provided with recesses 14 to receive resilient fingers on the ends of plate 11 as is well known in the art.

The slide walls of body A are provided with a pair of transversely aligned apertures 15—15, one of which has an enlarged counter bore. By means of apertures 15—15, the body A is telescoped over the cylindrical portion of guide sleeve B unitl the counter bore is engaged with an enlarged intermediate collar 16 on guide sleeve B. By threaded engagement 17 of the external threads of guide sleeve B with the internal threads of a cup-like spring cover 18 the body A is retained in position. Within the cover 18 is a compression spring 24 surrounding rod portion 19 of follower D. An enlarged plunger portion 20 of follower B is located in an axial internal bore of guide sleeve B and is in contact the end portion 21 of load carrying member E. The plunger portion 20 of follower D has a pair of diametrically opposed lugs 33—33 which in the assembled position (FIG. 1) are positioned in longitudinal keyways 34—34 extending the length of the internal bore of sleeve B. The lugs 33—33 are so positioned with relation to the face of plunger 20 that when movement of plunger 20 is arrested by lugs 33—33 striking abutment 35 the face of plunger 20 will fill the void left by load carrying member E exiting spherical bearing fitting F and outer face of plunger 20 will be flush with the outer face of spherical bearing fitting F to provide a smooth outer mold line for the Shuttle.

Sleeve B has a pair of cutout portions 23—23 which in effect form web portions 25—25. Plate-like slider-latch C has a keyhole shaped cutout including a large circular end portion 26 sized for passage of end portion 21 of member E and a slot 27 edged by a pair of spaced slider rails 28. Slot 27 is sized to cooperate with web portions 25—25 of sleeve B. In the latched position (FIG. 1), the slider-latch C, normally lubricated with a dry lubricant, straddles the end portion 21 of shank E with rails 28 received in sleeve recesses 23 and shank slots 22 of load carrying member E.

The faces of slider rails 28 frictionally engageable with the mating surfaces of slots 22 are inclined at 2° ramp angle to the opposite faces of the rails normal to the axis of sleeve B, i.e., below the coefficient of friction so that the mechanism does not tend to separate under normal load. The angle is adjusted relative to the shank diameter and tension so that at approximately 60% of the slider stroke, the tension is completely removed providing the following advantages:
1. Large areas carry the tensile load.
2. The friction load decreases as the pressurized chamber volume increases.
3. There is complete shank relaxation of the load carrying member prior to release.
4. There is no appreciable wear or brinelling.

Assembly

Figure 4B:
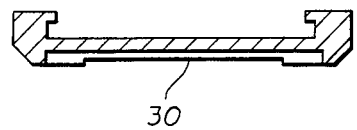
FIG. 4b is a center section through the slider attenuator.

In order to assemble the parts, an aluminum attenuator 30 is slipped loosely over the end of slider C with inwardly directed fingers 38 of attenuator 30 (FIG. 4b) engaging notches 36 in the end of slider latch C. The assembly of slider latch C with attenuator 30 attached is then slipped loosely into the open end of body A far enough to capture the attenuator. The circular portion 26 of the keyhole slot of slider C is aligned with the bores 15—15 of body A and sleeve B, which is secured to spherical bearing fitting F by threaded engagement, is loosely slipped through the bores until threaded engagement collar 16 is positioned in the counterbore of aperture 15. By rotating sleeve B until webs 25 line up with slider slot 27, slider C can be moved farther into body A capturing sleeve B.

The load carrying number E can then be slipped into the bore of sleeve B and the slider driven home to the position shown in FIG. 1 with slots 22 of shank E latched against slider rails 28 of slider latch C and firmly held there by the force of preloaded compression spring 24 acting on follower 20. The slider C is secured by shear pin 7a forming the basic load carrying and load releasing means. The open end of body A is closed by plate 11 and cover 12. The attenuator 30 being made of aluminum or other frangible material minimizes damages to the slider-latch C and permits reuseability of the slider-release mechanism.

Operation

When it is desired to disconnect the load carrying member B, chamber 10 is pressurized by an activating charge or other pressure means. The resultant force moves piston 7 with sufficient energy to break shear pin 7a and move lubricated slider-latch C. Such movement drives slider rails 28 out of slots 22 aligning the circular portion 26 of the keyhole slot in slider C with end portion 21 of load carrying member E. The slight angle between the slider rails 28 and mating wall of slots 22 proportionally relieves the load as the activation pressure drops, thereby assuring complete release without exessive pressure and low terminal velocity of slider latch C which can be absorbed by the attenuator 30 facilitating reuse. Circular portion 26 allows passage of end portion 21 and the release of load carrying member E. Preloaded compression spring 24 acting upon follower D will cause the follower to move along the internal bore of sleeve B until lugs 33 on plunger 20 are arrested by stop 35 at which time the face of plunger 20 will be aligned with the outer face of fitting F.

The entire load carrying member E being highly stressed, must be constructed of high strength material. The latching rails of slider, one face of the body, and a small section of the sleeve are also highly stressed and need be constructed of high strength material. However the majority of the body can be of inexpensive, light weight aluminum with saving in cost and weight. The shank, sleeve, slider-latch, and one face of the body may be constructed of more rugged material, such as inconel. The plate and cover at the lower end of the body are readily removable for replacement of the deformed attenuator-bumper, for reuse of the device.

We claim:
1. A releasable support device comprising a body having an opening in a wall thereof, a load-carrying part extending through said opening into said body, a latch part slidable in said body, said load-carrying and latch parts having cooperating elements for, respectively, latching and releasing said load-carrying part as said latch part is shifted, means to shift said latch part, and means actuable as said load-carrying part is released to close said body opening, said means actuable also includes a portion following said load-carrying part for closing said body opening as said load-carrying part is expulsed from said body.

2. A reuseable slider release machanism for latching and releasing a load carrying member which has a pair of diametrically opposed slots, said slider release mechanism comprising a guide sleeve for slidingly receiving the load carrying member, a slider latch member extending transversely of the guide sleeve, the slider latch member having a keyhole slot, the circular portion of the keyhole slot sized to permit passage of the load carrying member, the leg portion of the keyhole having a pair of slider rails, the slot and rails sized to cooperate with the diametrically opposed slots of the load carrying member to entrap the load carrying member, the mating surfaces of the slider rails engaging the load member slots having a ramp angle below the coefficient of friction whereby friction during relative movement of the slider latch member to the mating surface of the slots is decreased, actuator means to move the slider latch member transversely to align the circular portion of the keyhole slot with the load carrying member releasing the load carrying member and preloaded force means axially aft of guide sleeve for driving the released load carrying member out of said sleeve member.

3. The reuseable slider release mechanism set forth in claim 2 including a box like body encompassing the slider release mechanism, the body having a closed end containing the actuating means, the opposite end having a removeable closure, the slider latch member having an attenuator on the removeable closure end.

4. The reuseable slider release mechanism set forth in claim 2 including the preloaded force means having follower means for closing the outer and of the guide sleeve.

5. The reuseable slider release mechanism set forth in claim 4 in which the follower means includes a spring driven piston.

6. The reuseable slider release mechanism set forth in claim 5 in which the guide sleeve has an axially extending keyway and the piston has a lug cooperating with the keyway and means to arrest outward movement of the piston.

7. The reuseable slider release mechanism set forth in claim 3 including follower means for closing the outer end of the guide sleeve.

* * * * *